United States Patent [19]

Hannan et al.

[11] Patent Number: 4,771,462

[45] Date of Patent: Sep. 13, 1988

[54] COMMUNICATION PORT ENCRYPTION/DECRYPTION METHOD AND APPARATUS

[76] Inventors: Forrest A. Hannan, 18017 Woodcroft St., Azusa, Calif. 91702; Dale A. Dixon, 2448 Sepulveda Blvd., #101, Torrance, Calif. 90501; Linda L. Ostrander, 970 Camelot Dr., Crystal Lake, Ill. 60014

[21] Appl. No.: 16,011

[22] Filed: Feb. 18, 1987

[51] Int. Cl.⁴ ............................................. H04L 9/04
[52] U.S. Cl. ...................................... 380/44; 380/48; 380/50
[58] Field of Search ...................... 380/48, 49, 50, 44

[56] References Cited

U.S. PATENT DOCUMENTS

| | | | |
|---|---|---|---|
| 3,936,601 | 2/1976 | Obeginski | 380/48 |
| 4,313,031 | 1/1982 | Widmer | 380/48 |
| 4,358,852 | 10/1982 | Ichikawa et al. | 380/50 |
| 4,408,093 | 10/1983 | Place | 380/49 |
| 4,447,672 | 5/1984 | Nakamura | 380/50 |

Primary Examiner—Salvatore Cangialosi
Attorney, Agent, or Firm—Douglas B. White

[57] ABSTRACT

There is provided herein an apparatus and method of encryption/decryption which incorporates a microprocessor into security devices. A first such device is connected to the communication port of the accessing remote terminal, and a second such security device is connected to the communication port of the computer to which access is sought. This microprocessor is programmed to encode and decode all signals directed through the communication port of the computer terminal.

The system incorporates a programmed ROM associated with the sending computer terminal containing tables of characters and a programmed ROM associated with the receiving computer terminal containing a complementary image of the tables programmed into the sending station. When data is transmitted by the sending computer terminal it is processed by the sending encryption device. The character code that is generated by the remote terminal is used as an address to access the ROM of the sending encryption device. The character in that memory location is then retrieved and transmitted in place of the original clear data. When the transmitted encrypted code is received, the microprocessor associated with the receiving device uses the received code as an address location and retrieves the character contained within that address location and thereby reclaims the clear data.

8 Claims, 5 Drawing Sheets

COMMUNICATION PORT ENCRYPTION/DECRYPTION METHOD AND APPARATUS

BACKGROUND OF THE INVENTION

1. Field of the Invention

This invention relates generally to security devices and systems for controlling access to a computer via a remote computer terminal. More particularly, this invention relates to encryption/decryption methods and devices designed to be interposed between the computer and the remote terminal, but the method of this invention is adaptable to encrypt and decrypt any digital communication link.

2. Description of the Prior Art

Generally in data communications there is provided communicating terminals controlled by keyboard devices arranged to input a character code to the computer terminal in response to a keyboard character selection. Each terminal is typically comprised of a computer which is interconnected by cable or other medium, including electromagnetic waves, to one or more other computers. These interconnections may also include modems to interconnect the computers and terminals through phone lines.

Private data communications has attained increased priority in recent years. While the need for and volume of the data communication links have increased in recent years, the most significant increase has occurred in the area of security requirements since once a computer is on-line with a modem, it may be accessed by anyone with a terminal and a compatible modem.

Early security techniques involved the use of a password, a method which is still popular and effective for a first level of security. Anyone seeking access to a computer from a terminal is required to enter a user identification number or character string and an associated password into the terminal seeking access. This system is fairly effective in an environment where the access to all terminals could be controlled, but was found to be ineffective when modems are used and unlimited access to the computer can be obtained. The problem is that any accessing computer can be programmed to break the computer security codes when this unlimited access occurs. Little security risk exists if access can be strictly controlled, but with the vast numbers of small personal computers and computer controlled modems in existence today, it has become relatively easy and relatively popular to program the personal computers to try all of the potential combinations of user identification codes and associated passwords. When the remote computer terminal discovers the correct code, it is allowed full access to any of the data on that system.

Several devices have been marketed and are currently in use which address this problem and provide limited protection against unauthorized access. The "call back" modem is pre-programmed to dial, or call back, a specific prearranged phone number whenever it receives a password. Thus a caller seeking access, which caller must be at a specific phone number, sends a certain password via its computer terminal transmission port and modem. Upon receiving the password, the modem at the receiving computer introduces a second level of security by calling back a certain preselected phone number to allow access only to that terminal and modem at that specific phone number location. Unfortunately, this system works for only limited phone locations and must be changed every time the accessing terminal is moved to a new location.

To further increase security it is necessary to provide control of the individuals using accessing terminals. While the user identification and password are useful at a first level of security with the unsophisticated user, it is ineffective against the knowledgeable user. Tougher solutions involve segregating sensitive and confidential files and confining those files to a controlled access facility. The theory is that controlling access to the facility is more readily accomplished than limiting access to data and fles within a computer from someone who has gained access.

Clearly the need is recognized for an improved method of providing security which is not only cost effective, but also extremely difficult to bypass. Moreover, the preferred system would be isolated from the computer to separate accessing control physically from the computer to be accessed.

SUMMARY OF THE INVENTION

Generally there is provided an apparatus and method of encryption/decryption which incorporates a microprocessor chip into a security device which is separate from the computer to which access is sought. This microprocessor is programmed to operate with additional RAM and ROM memories and to encode and decode all signals directed through the communication port of the computer terminal. The circuitry provides a customary interface of input/output devices (serial to parallel convertors) between the microprocessor and the data communication line through which data is received from the sending computer terminal and transmitted to the receiving computer terminal.

The heart of the system is the pre-programming of the ROM associated with the sending computer terminal with tables of characters, numbers or values, and the pre-programming of the ROM associated with the receiving computer terminal with a complementary image of the tables programmed into the sending station. When data is transmitted by the sending computer terminal and received by the sending encryption device, the character code that is received is used as an address to access the ROM of the sending encryption device. The numerical value or character code in that memory location is then retrieved and transmitted in place of the original clear data. On the receiving end, the ROM associated with the receiving decryption device is pre-programmed with a complementary image table. When the transmitted encrypted code is received, the microprocessor associated with the receiving device uses the received code as an address location and retrieves from the ROM associated with the receiving unit the value or character code lying within that address location. Therefore, with this encryption system, the transmitted message of an unauthorized user will be garbled at the receiving end. Most importantly, however, is that without the proper sending device, no information will ever be received by the computer into which access is sought. This is accomplished by the separation of the encryption/decryption devices from the computers.

In the preferred embodiment, an initial encrypted identification data stream is passed between the two encryption/decryption devices to establish the communication path and to establish the number of tables to be used and the starting point. The length of this data stream is dependent upon the level of security required. When multiple tables are used to enhance security, the data received from the communication port of the sending computer terminal supplies the address of the memory location within the ROM of the sending device in the same manner as with the single table procedure. Likewise, the receiving device associated with the receiving computer terminal uses the transmitted encrypted data as addresses to the ROM associated with the receiving device. However, with the availability of multiple tables, the system can be arranged to use the tables in a predetermined sequence, such as in successive order, using the encrypted data element as an offset into the next table, or by other means commonly known in the art of encryption.

In the preferred and most secure form of the present invention, the tables used and pre-programmed into the ROMs are created to represent a random pattern of character codes, values or numbers. Further, each table is established as part of a table set having first the table of encryption values and second the complementary image of that table for decryption. Each table set will, in the preferred embodiment, consist of 512 bytes of information with a random number generator being used to arbitrarily assign an eight bit character to each of the first 256 locations within the ROM memory. These numbers will be the actual numbers used for transmission from the sending device. The second 256 locations of the ROM will contain the complement of the first 256 locations. With this complementary image, the receiving end will use the second half of the table set to change the received data back to the original clear data.

In a typical implementation, the system will use sixty table sets, that number being the total capacity of a 32K ROM available for the tables. Additional table sets would be possible and within the scope of this invention by adding additional ROMs. The microprocessor used in the preferred embodiment of this invention is an 8088 microprocessor chip which is capable of addressing 32 ROM devices.

In the preferred method, the aforementioned sixty tables are divided into arbitrary groups of four and the start-up program is used to initialize and orient the communication devices to establish the table group to be used. In a further aspect of this invention, this table division allows the system to establish a single master device having a ROM containing all sixty tables. The master can then control access by a possible fifteen slave devices, each having one group of four tables.

The circuitry of the present invention generally comprises customary microprocessor handling circuitry including clock generating devices, line drivers, input/output devices, and RAM and ROM devices. Additional circuitry is provided to select desired baud rates and to initiate security alerts. In such a micoprocessor system the microprocessor is fully programmable from the input/output bus and may be instructed to load programs and data into memory and to execute programs.

Other objects and advantages of the invention will become apparent upon reading the following detailed description and upon reference to the drawings, in which.

DESCRIPTION OF THE PREFERRED EMBODIMENT

While the invention will be described in connection with the preferred embodiment, it will be understood that it is not the intent to limit the invention to that embodiment. On the contrary, it is the intent to cover all alternatives, modifications and equivalents as may be included within the spirit and scope of the invention as defined by the appended claims.

Figure 1:
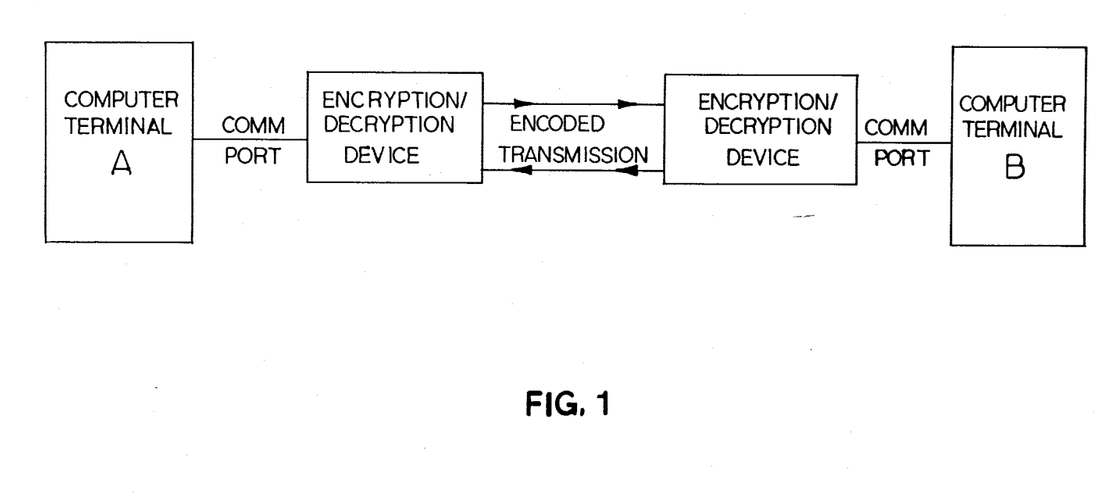
FIG. 1 is a block diagram of the circuitry of the present invention.

Generally there is provided, as shown in block diagram form in FIG. 1, a transmission and communication system in accordance with the present invention. A computer terminal A is interconnected for communication with a computer terminal B. Interfacing with the computer terminal A at the communication port of the computer terminal A is shown an encryption/decryption device of the present invention. This encryption/decryption device is arranged to receive transmitted data from the communication port of computer terminal A and to interface this data to the transmission cable. While this preferred embodiment is described in connection with the simplest transmission media, the cable, it should be understood that the invention is not to be limited thereby, but rather is intended to include all transmission media compatible with the method claimed. At the right end of the transmission cable there is shown an encryption/decryption device arranged to receive the transmission from the encryption/decryption device of computer terminal A and to interface this transmission to computer terminal B.

The described transmission is also possible in the reverse direction with the transmission from computer terminal B being received and interfaced to the transmission cable by the encryption/decryption device associated with the computer terminal B. Also, the encryption/decryption device associated with computer terminal A is arranged to receive the transmission from the encryption/decryption device associated with computer terminal B and to interface the data to the computer terminal A.

The transmission between the encryption/decryption devices is encoded by the method described below and is intelligible only to a device having the proper decoding circuitry and information. Particularly, the encryption/decryption device is provided with a set of tables in its memory in which to encode and decode the data. In the preferred embodiment of the present invention, these tables would represent an array of random numbers generated and loaded into specific address locations in a ROM. The data received from the computer terminal is used as the address of the encoded data stored in memory. The encoded data is retrieved from the memory and transmitted via the transmission cable. At the receiving end, the received data is used as the address of the memory location holding the clear data. This is referred to as the complementary image of the encryption table and allows the clear data to be retrieved from the memory of the receiving encryption/decryption device and interfaced to the receiving computer terminal.

Figure 2A:
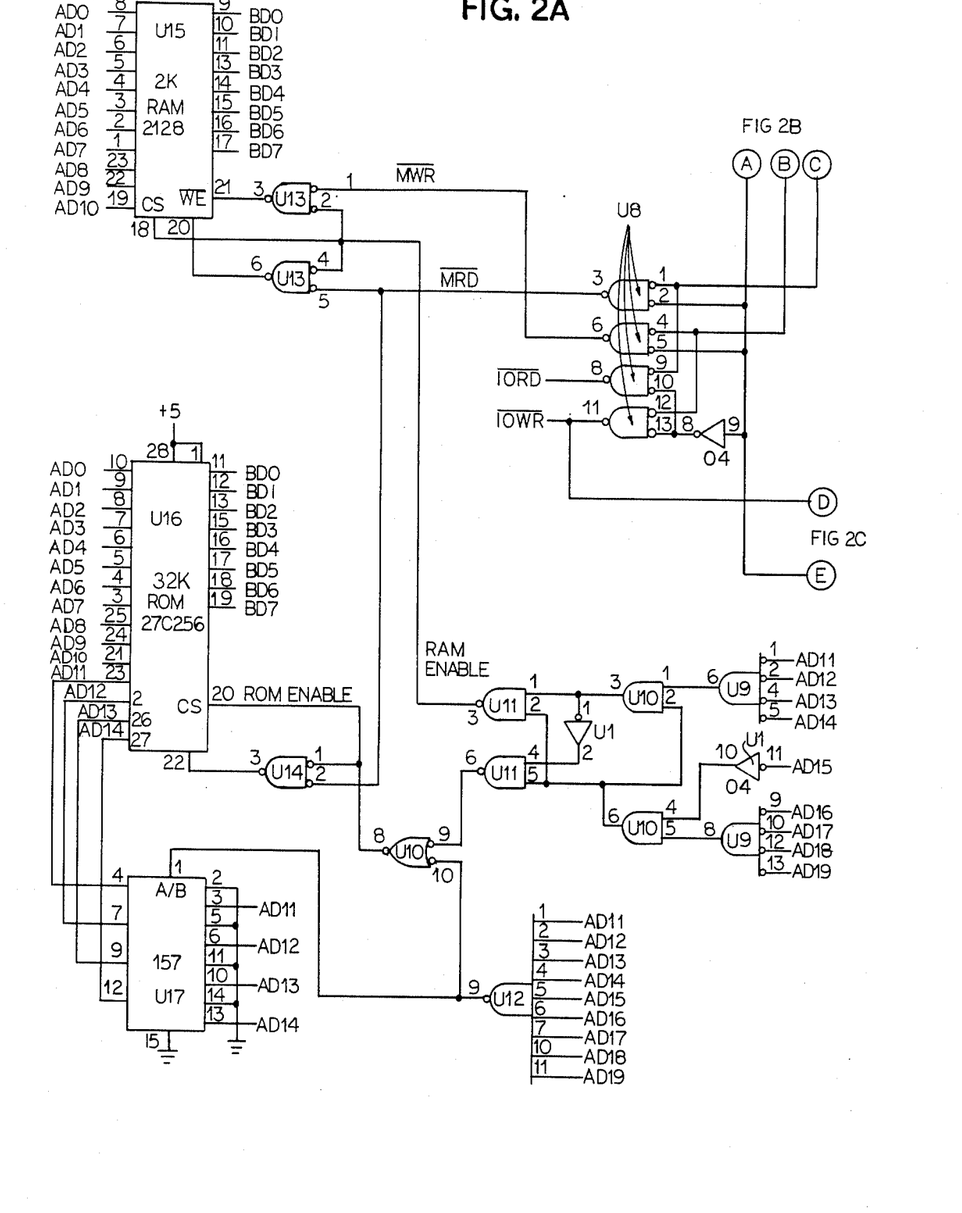
FIG. 2A is a portion of the schematic of the circuitry of the present invention showing the schematic containing the ROM and RAM devices.
Figure 2B:
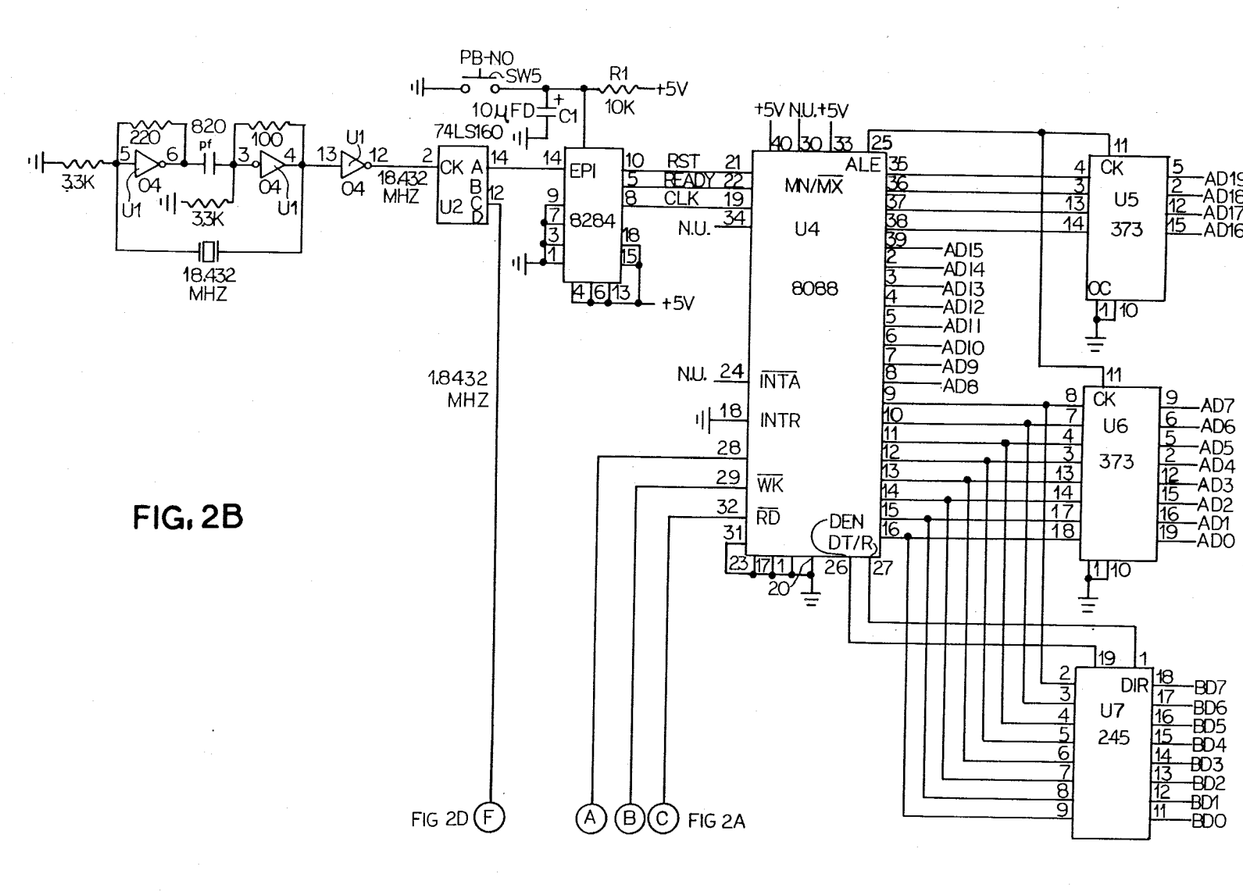
FIG. 2B is a portion of the schematic of the circuitry of the present invention showing the microprocessor device, the clock circuitry, the octal latches, and bus transmitters and receivers.

Turning now to the schematic as shown in FIG. 2B, there is depicted a microprocessor chip U4, known in the industry as an 8088 microprocessor. This device is arranged to receive and transmit data through its address and data busses, and to access the additional RAM and ROM memories. The general programming techniques of this microprocessor and the loading and execution of instructions are well known in the art and will not be covered here in great detail. Reference is made herein to current informational texts on the subject such as, James W. Coffron, *Programming the 8086/8088*, (Sybex, Inc., 1983).

For generating the clock timing for the circuitry, there is provided a clock pulse generating circuit comprised of an 18.432 mhz crystal arranged with two 74 S 04 hex inverters to create an oscillator. This clock signal is then passed through a buffer to a divide by ten counter known as a 74 LS 160, a Synchronous Presettable BCD Decade Counter. The baud rate and the reset and ready signals for the microprocessor are established from the output of this counter. The reset and ready signals are first processed in the 8284 chip arranged to convert the clock signals to the required control signals. For the control of the data on the input/output busses, the microprocessor is coupled to the 74 LS 373 octal latches U5 and U6, and to the 74 LS 245 octal bus transmitter/receiver U7.

The basic processor machine cycle requires four time states of one clock period each, T1, T2, T3, and T4. During the first clock period, T1, address information from the 8088 microprocessor appears on its terminals and is latched into the octal latches where the information remains at their outputs during the remainder of the machine cycle. During the second through the fourth clock periods, T2 through T4, the input/output data from the 8088 microprocessor is fed to the 74 LS 245 bi-directional octal buffer U7.

The 8088 microprocessor is capable of directly addressing one megabyte of memory. This requires the use of 20 address lines, designated AD0 through AD19 in FIG. 2B (the hexadecimal designations for this range are 00000 through FFFFF). The RAM memory in this system is arranged to occupy the lowest 2K memory locations of this address range, 00000 through 007FF hex. The basic program used by the system is physically stored in the lowest 2K of the ROM, and the remainder of the ROM memory stores the tables used in the encryption/decryption operation.

One of the characteristics of the 8088 microprocessor is that the first instruction it executes upon reset or power up is located at memory location FFFF0 (hexadecimal designation of the memory address). This location is not available in the 32K ROM and therefore a 74 LS 157 multiplexer U17 is used to manipulate the address information to cause access to memory space FF800 through FFFFF instead.

Figure 2C:
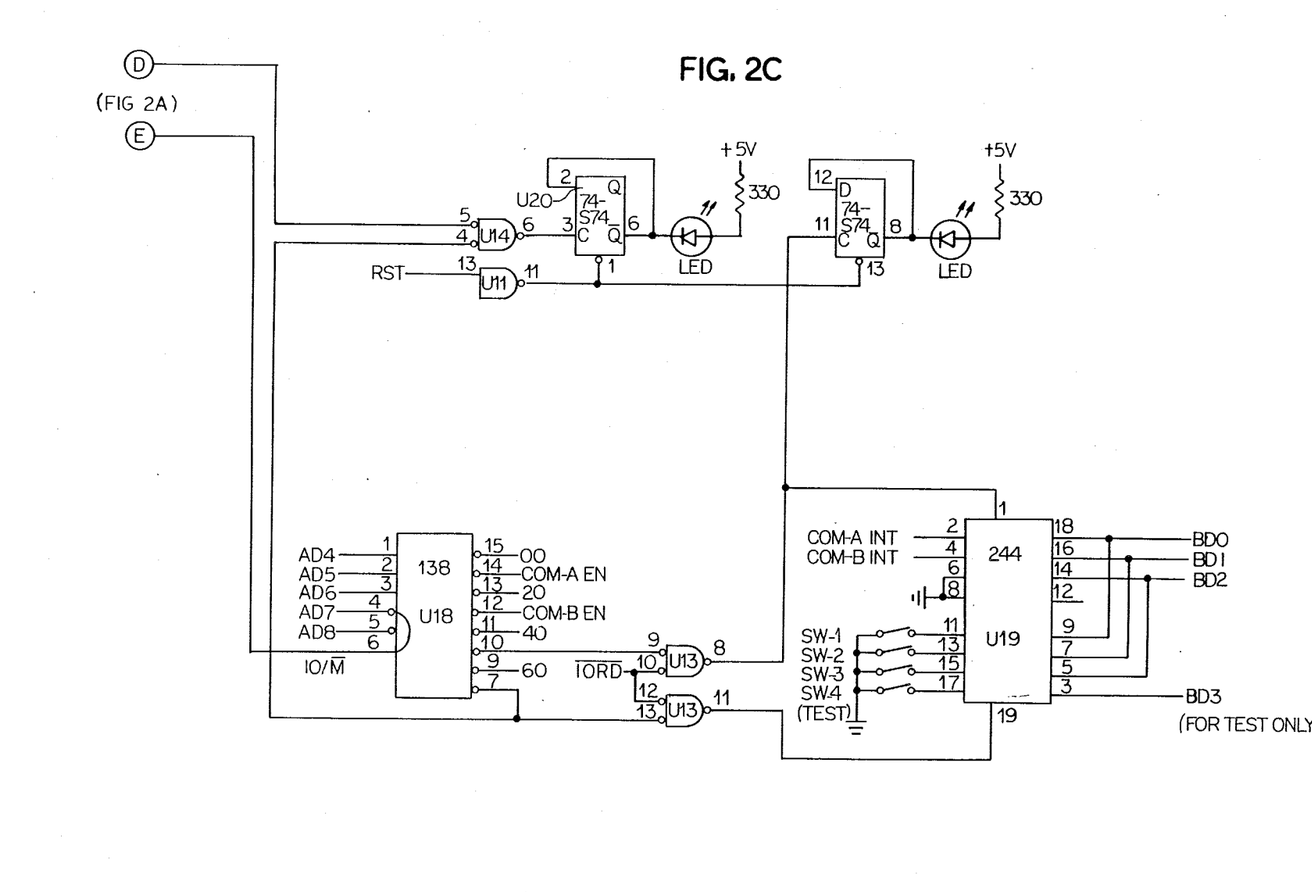
FIG. 2C is a portion of the schematic of the circuitry of the present invention showing the baud rate selection circuitry and the security alert circuitry.
Figure 2D:
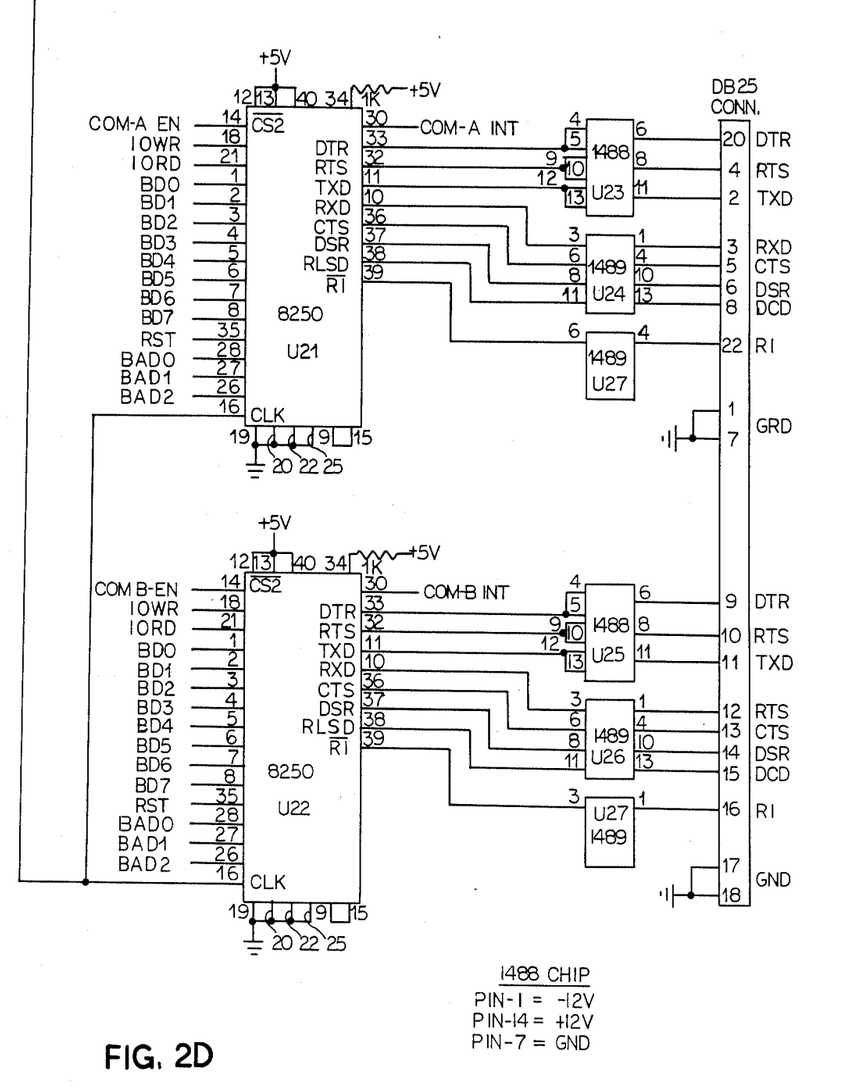
FIG. 2D is a portion of the schematic of the circuitry of the present invention showing the parallel to serial input/output deivces (INS8250 Asynchronous Communications Element UART).

The 8250 UART communications devices, U21 and U22, are parallel to serial converters and are used to communicate with the computer, terminal or other external device through the level shifters U23, U24, U25, U26, and U28. Port "A", which is the device designated U21, is the outside line carrying encrypted data while port "B", which is the inside line, communicates in clear text to the operator's device.

DETAILED DESCRIPTION OF THE CIRCUITRY

Referring to the schematic diagram of FIG. 2B of the device, two 74 S 04 hex inverters U1 are shown. Pins 3, 4, 5 and 6 represent two gates on the U1 device and are used to form a crystal controlled multivibrator with a frequency of 18.432 mhz. This frequency is chosen because of the requirement of the 8250 UART baud rate divisor. A third gate on the chip U1 referenced by pins 12 and 13 is used as a buffer for the multivibrator output.

The buffered 18.432 mhz signal is fed to a 74 LS 160 Decade Counter U2 to produce at its output pin 14 a 9.216 mhz square wave. This is used as the basic frequency source for the 8088 microprocessor. The signal at pin 12 of the Decade Counter is a 40% duty cycle signal with a frequency of 1.8432 mhz which is the frequency required for the proper operation of the 8250 UART devices.

A clock generator/drive device U3 furnishes the timing synchronization for the microprocessor. When power is applied to the system, or at any time manual reset is provided by the switch SW5, the capacitor C1 and the resistor R1 provide a relatively slow time constant rise to pin 11 of the 8284, the reset input. The master reset to the system, pin 10 to the 8284 device, provides a reset signal in response to the voltage rise on pin 11. This reset signal initializes both the microprocessor and the 8250 UARTs and resets the error signal to the processor informing it that the external circuitry is ready. As no external interruptions are anticipated, this ready signal is always high. For the same reason, all the sync input pins, 3, 4, 6 and 7, are strapped in their enabling state. The clock signal at pin 8 is a 33.3% duty cycle waveform operating at a frequency of 3.072 mhz, one third of the 9.215 mhz input frequency.

The 8088 microprocessor U4 is connected for operation in the minimum mode. This is done by strapping pin 33 high (to a voltage of +5v) and, because the interrupts are not being used in this circuit, the interrupt pins 17 and 18 are strapped in their inactive state.

The basic 8088 microprocessor machine cycle requires four time states, T1, T2, T3 and T4, with each time state requiring one clock period of 333.3 nsec.; therefore, the basic machine cycle time is 1.333 microseconds.

During the first clock period, T1, time-multiplexed pins 9 through 16 and 35 through 38 carry addess information to the 74 LS 373 octal latches U5 and U6. Also during the first clock period, T1, the ALE signal (pin 25) is activated. This signal is fed to the clock input of the two octal latch chips U5 and U6. The address information is then latched and held at their outputs during the remainder of the machine cycle. Pins 2 through 8 and pin 39 of the 8088 microprocessor are the rest of the address pins, but these pins are stable throughout the machine cycle and therefore do not require latching.

During the second through the fourth clock periods, T2 through T4, pins 35 through 38 of the 8088 microprocessor have status information which is not used in this application, but pins 0 through 16 are the data input/output pins. The input/output data from pins 0 through 16 is fed to a 74 LS 245 bi-directional octal buffer U7. Pin 19 of the 245 chip is the enable pin of the octal buffer and is under control of pin 26 on the 8088 microprocessor. Pin 26 of the 245 chip is labeled as the DEN signal and is active during the second, third and fourth clock periods during those instructions which require data input/output. Pin 27, labled DT/R, controls the direction of data flow through the 245 octal buffer during data input/output instructions.

Memory input/output control is provided on pin 28 of the 8088 microprocessor and is labeled the IO/M pin. It is at a logic high during input/output instructions and is logic low during memory reference instructions. Pin 29 of the 8088 microprocessor is the write pulse and is low during the third and fourth clock periods when any write instruction is executed, either input/output or memory. Pin 32 carries the read pulse and operates the same as the write pulse except that it is active during read operations.

For controlling the function of reading from the RAM and the ROM devices, a memory access gate U8 is provided. During a memory read instruction, pin 2 of this gate will be pulled low. A low-going RD pulse will then be through to pin 3 activating the read pin on the selected RAM or ROM memory chip. The memory access gate U8, pins 4, 5, and 6 are the memory write gate connections. They operate in the same manner as the read gate but for write instructions. Since it is not possible to write to the ROM chip, the write signal does not go to the ROM.

The remaining gates of the U8 device are used for input/output operations. The input/output read signal appears at pin 8 and the input/output write signal appears at pin 11. The hex inverter U1, pins 9 and 8, invert the IO/M signal which is high during input/output operations. This enables the input/output read or write gate depending on the instruction being executed.

The 8088 microprocessor is capable of directly addressing one megabyte of memory. This requires the use of 20 address lines which are designated AD0 throuugh AD19. The hexadecimal designations for this range are 00000 through FFFFF. The RAM memory in this system occupies the lowest 2K of this address range, 00000 through 007FF hex. The upper nine addresses, AD11 through AD19, are handled by gate device U9 (7425) and one gate of the hex inverter U1 device. When all these addresses are low, the gating combination is satisfied which enables the gate device U11, pins 1, 2, and 3, sending RAM ENABLE to the gate device U13, pins 2 and 4 as well as RAM enable pin 18 on the RAM memory chip U15. Read and write signals are thus controlled by the gate device U13 output pins 3 and 6.

The basic ROM program used by the system is physically stored in the lowest 2K of the ROM. The remainder of the ROM memory stores the tables used in the encryption/decryption operation. One of the characteristics of the 8088 microprocessor is that the first instruction it executes upon reset or power up is located at hexadecimal memory location FFFF0. This location is not available in the 32K ROM, and it is therefore necessary to cause the ROM to access the memory space FF800 through FFFFF instead.

This memory address manipulation is done with the 74 LS 133 gate device U12, the 74 LS 157 Quad Multiplexer U17, and one gate of the gate device U10. The output of the 13 input NAND gate device U9 is low only when all its inputs are high. The "A" inputs of the Quad Multiplexer U17 are on pins 2, 5, 11 and 14. The "B" inputs of the Quad Multiplexer U17 are on pins 3, 6, 10 and 13. When the Select pin, pin 1, is low the "A" inputs are selected and when pin 1 is high, the "B" inputs are selected.

Assume that the processor is selecting address FF800. This means that addresses AD11 through AD19 are all high. This satisfies the conditions for the multiple input inverting AND gate device U12 and its output is therefore low. This low signal is fed through the gate device U10 to its output at pin 8, enabling pin 20, the ROM chip select pin. It also enables the ROM read gate U14, pins 1, 2 and 3. The low signal at the gate device U12, pin 8, is also fed to pin 1 of the Quad Multiplexer U17 enabling the "A" inputs. These inputs are all grounded and therefore feeding low signals to the high four address lines on the ROM. This causes the ROM to interpret the address location as 00000. If any one of the addresses from AD11 through AD19 is low, pin 9 of the gate device U12 will be high, causing the Quad Multiplexer U17 "B" inputs to be selected and normal addressing takes place.

Conflict between the RAM and ROM at the lower 2K of memory addressing is handled by the gate device U9, pin 6, which, when low, causes the gate device U10, pin 3, to be low. This signal is then inverted by the hex inverter U1, pins 1 and 2 enabling the gate device U11, pin 6, and selecting the ROM instead of the RAM.

A 3-line to 8-line decoder U18 is provided to control the input/output operations by providing control signals to the 8250 UART devices. Only four of the eight outputs are in use. Pin 14 is active in the address range 10 through 1F hex, and is used to control operation of the 8250 U21, COM port "A". Pin 12 is active in the address range of 30 through 3F hex and controls COM port "B". Pin 10 is active in the address range of 50 through 5F hex and is used in conjunction with one half of the 74 LS 244 Octal Buffer U19 to poll the 8250 UART interrupts.

One half of the Octal Buffer is controlled by pin 1 and the other by pin 19. The outputs are 3-state, allowing them to be OR tied. Pin 7 is active in the address range of 70 through 7F hex, and therefore reads the four position DIP switch and sets the UART baud rate accordingly. This output also controls gates on the gate device U14, pins 4, 5, and 6. The combination of this gate and the 74 LS 74 flip-flop is used under program control to blink the error LED under certain error conditions. Following an error or security alert, the RST signal to the gate U11 resets the flip-flop.

For communicating with the external world, there are provided 1488 level shifters U23 and U25. They accept TTL level inputs from the 8250 UART and change them to RS-232 levels before outputting them to the outside world. Likewise, received signals are changed from RS-232 levels to TTL levels for use by the 8250 UART.

The 8250 UART device U21 comprises a Port "A", the outside line, for carrying encrypted data, while the 8250 UART device U22 comprises a Port "B", the inside line, which communicates in clear text to the operator's device.

These chips contain several internal registers which are used to control their operation, to pass data back and forth, and to supply status information to the controlling device. Data, status, and command information are passed to and from the 8250 UART device via the Data pins (pins 1 through 8). These are bi-directional pins under control of the IORD and IOWR pins (pins 21 and 18 respectively). Pins 26, 27 and 28 are address lines which control selection of the internal registers.

Each 8250 UART Communications Device may be enabled or selected by a signal on pin 14 which is controlled by the line decoder U18. The clock input is provided on pin 16, and that frequency is divided by a counter on the chip, the division ratio of which is set up by the 8088 microprocessor. An interrupt output is provided on pin 30, and is used as the Received Data interrupt.

mentary image, whereby given a first address to access the Table A, the number found in that address will be the address of the location in Table B containing the first address.

TABLE A

SEND TABLE

|   | _0 | _1 | _2 | _3 | _4 | _5 | _6 | _7 | _8 | _9 | _A | _B | _C | _D | _E | _F |
|---|----|----|----|----|----|----|----|----|----|----|----|----|----|----|----|----|
| 0_ | AC | 6E | 66 | AD | 90 | B9 | BD | 44 | FF | B4 | B0 | E5 | 01 | 77 | CF | 38 |
| 1_ | 4B | 45 | 28 | F4 | 48 | 3C | EB | 94 | D4 | 0B | C2 | CE | 03 | 32 | 5B | 7E |
| 2_ | 9B | B3 | C5 | B6 | D5 | 5C | CB | 64 | E9 | A0 | EF | 12 | 5A | 67 | 68 | BC |
| 3_ | FE | E7 | 9D | 8B | F7 | 04 | 55 | 29 | 41 | 72 | AA | B1 | 91 | 3D | A5 | 20 |
| 4_ | 85 | AE | 1C | D9 | 76 | EA | 2B | 9A | 1B | 2E | 05 | 52 | 8C | 1D | 65 | 7D |
| 5_ | E1 | ED | C6 | 74 | 22 | 96 | B5 | FA | 29 | 99 | 46 | F1 | CA | 31 | 0F | F3 |
| 6_ | A7 | 50 | 88 | 0E | 70 | 78 | E3 | 00 | BA | 80 | 40 | FB | AF | 5F | 07 | AB |
| 7_ | 49 | DF | 71 | FD | 82 | 02 | 7B | F0 | 5E | C8 | 2A | 87 | DE | 2F | 7A | C1 |
| 8_ | D6 | 11 | 47 | 75 | 9F | E0 | F6 | 08 | 13 | 1A | 14 | 0A | F8 | C4 | A1 | 79 |
| 9_ | 4A | 17 | DC | 9C | 57 | 0C | BB | 63 | A4 | 3B | CD | 59 | 60 | DB | 4F | BE |
| A_ | 27 | 8A | E8 | 3F | 92 | DD | 23 | 9E | D3 | 2C | 4E | 6C | 83 | 95 | A2 | A8 |
| B_ | A9 | A3 | 97 | 86 | 6F | 53 | 30 | 09 | DA | A6 | 2D | 4C | F5 | 98 | 35 | EC |
| C_ | 73 | F2 | 6D | E2 | 51 | 1E | 7C | 25 | B8 | F9 | 33 | 69 | E4 | 39 | 3A | 1F |
| D_ | C9 | 06 | C7 | 36 | E6 | 8F | D1 | FC | 0D | 8E | 7F | EE | 58 | 19 | C3 | 10 |
| E_ | 56 | D2 | 84 | CC | D8 | D0 | C0 | 8D | 6B | 43 | 16 | 24 | 89 | D7 | B2 | 34 |
| F_ | 93 | 61 | BF | 18 | 6A | B7 | 3E | 62 | 81 | 37 | 54 | 15 | 21 | 4D | 5D | 42 |

TABLE B

RECEIVE TABLE

|   | _0 | _1 | _2 | _3 | _4 | _5 | _6 | _7 | _8 | _9 | _A | _B | _C | _D | _E | _F |
|---|----|----|----|----|----|----|----|----|----|----|----|----|----|----|----|----|
| 0_ | 67 | 0C | 75 | 1C | 35 | 4A | D1 | 6E | 87 | B7 | 8B | 19 | 95 | D8 | 63 | 5E |
| 1_ | DF | 81 | 2B | 88 | 8A | FB | EA | 91 | F3 | DD | 89 | 48 | 42 | 4D | C5 | CF |
| 2_ | 3F | FC | 54 | A6 | EB | C7 | 37 | A0 | 12 | 58 | 7A | 46 | A9 | BA | 49 | 7D |
| 3_ | B6 | 5D | 1D | CA | EF | BE | D3 | F9 | 0F | CD | CE | 99 | 15 | 3D | F6 | A3 |
| 4_ | 6A | 38 | FF | E9 | 07 | 11 | 5A | 82 | 14 | 70 | 90 | 10 | BB | FD | AA | 9E |
| 5_ | 61 | C4 | 4B | B5 | FA | 36 | E0 | 94 | DC | 9B | 2C | 1E | 25 | FE | 78 | 6D |
| 6_ | 9C | F1 | F7 | 97 | 27 | 4E | 02 | 2D | 2E | CB | F4 | E8 | AB | C2 | 01 | B4 |
| 7_ | 64 | 72 | 39 | C0 | 53 | 83 | 44 | 0D | 65 | 8F | 7E | 76 | C6 | 4F | 1F | DA |
| 8_ | 69 | F8 | 74 | AC | E2 | 40 | B3 | 7B | 62 | EC | A1 | 33 | 4C | E7 | D9 | D5 |
| 9_ | 04 | 3C | A4 | F0 | 17 | AD | 55 | B2 | BD | 59 | 47 | 20 | 93 | 32 | A7 | 84 |
| A_ | 29 | 8E | AE | B1 | 98 | 3E | B9 | 60 | AF | B0 | 3A | 6F | 00 | 03 | 41 | 6C |
| B_ | 0A | 3B | EE | 21 | 09 | 56 | 23 | F5 | C8 | 05 | 68 | 96 | 2F | 06 | 9F | F2 |
| C_ | E6 | 7F | 1A | DE | 8D | 22 | 52 | D2 | 79 | D0 | 5C | 26 | E3 | 9A | 1B | 0E |
| D_ | E5 | D6 | E1 | A8 | 18 | 24 | 80 | ED | E4 | 43 | B8 | 9D | 92 | A5 | 7C | 71 |
| E_ | 85 | 50 | C3 | 66 | CC | 0B | D4 | 31 | A2 | 28 | 45 | 16 | BF | 51 | DB | 2A |
| F_ | 77 | 5B | C1 | 5F | 13 | BC | 86 | 34 | 8C | C9 | 57 | 6B | D7 | 73 | 30 | 08 |

The system of the present invention, the hardware of which has been described, is operated by a program stored in the ROM which is generated by a software program, the listing of which is attached to this specification as Appendix A. The tables loaded into the ROM and used in the encryption/decryption method may be generated by a separate hardware/software combination, or created by any other means known in the art within the scope of this invention.

PROGRAMMING

Although many methods exist in the prior art, in the preferred embodiment of this invention a software program is executed to generate sixty table sets with each table set consisting of 512 bytes. Preferably, each of the 256 bytes are randomly generated so that no two bytes are the same and no pattern is detectable. Since each byte consists of 8 bits, 256 bytes contain all possible combinations of 8 bits. The "complementary" image of this table set is then generated and stored in the next 256 bytes. The theoretical quantity of these table sets is 256 to the 256th power. Once created, these sixty table sets are loaded into ROM memory at a predetermined location by means well known in the art. For the purposes of the present invention, the circuitry and programming assume that the tables are at address location 1000:3000. The following is an example of a table set containing in Table A an array of numbers and is Table B a comple- Table A is an example of a Send Table which is arbitrarily or randomly generated and written into address locations. The addresses are notated in hexadecimal with the left digits along the left column and the right digits across the top. Accordingly the location designated "00", the upper left position of the table, carries the hexadecimal character AC. Table B is the corresponding complementary image Receive Table for Table A. Taking the character AC from the "00" location of Table A, and proceeding to row A and column C in Table B, the character "00" is reclaimed.

Reference will now be made to the program listing attached to this specification as an appendix, and specifically to page 1-18 of the listing. The first instruction executed by the program is the code for "boot" at location 0FF0 which instructs a jump to location F000:FA00. As previously described, when this is actually executed the ROM thinks it is at location F000:FFF0 (also written FFFF0) and the entire section of code starting at org 800 operates as if it is at location F000:F800. The boot jump actually takes us to location 0A00 which is where program execution really begins.

Instructions A00 through A03 turn on the ERROR light which will remain on unless otherwise instructed.

Instructions A05 through A23 test the RAM memory chip. The program writes a hex A to the memory location, then tests to make sure it is there. It then writes a hex 55 and compares that. It does this for all 2048 locations in the RAM. If an error is encountered, the program jumps to the routine called 'errl'.

After the RAM is tested, it is loaded with zeroes by instructions A28 through A2E.

Instructions A30 through A35 set up a stack area for the PUSH and POP instructions. The stack grows downward starting at location 100 hex.

Instruction A38 calls the subroutine 'stds' which sets the Data Segment register to 20 hex. The next instruction initializes the wrdel word in RAM to 1000 hex. The program then calls the subroutine 'crwb' to initialize 5 pointers in the RAM: wrbase=0, rdbase=100h, wrtop=800h, rdtop=900h and btdir=0.

Instruction A44 calls the subroutine 'romds' to set the Data Segment register to FF00, the address location necessary to access the data area of the ROM.

The instruction set A47 through A89 initializes the two 8250 input/output UART chips. In order to set the divisor latches on the 8250, it is first necessary to set the DLAB bit is the Line Control register. This is done by instructions A47 through A4B. With bit 7 is set in this register, it is possible to set the correct divisor for the baud rate selected. Two bytes are required for this operation. These are identified as MSB (most significant byte) and LSB (least significant byte). The baud rates implemented in this application are 300, 1200, 2400, 4800, 9600 and 19200. The only one of these that requires a MSB value other than 0 is 300. For this reason, MSB is set to 0 at this point by instructions A4D through A51. The DIP switches are read and compared to 0. This is because the value returned to 0 only if 300 baud is selected. If the value is 0, the word wrdel is changed to 2000h and 1 is loaded into the MSB register. This part is jumped if the value is not 0.

The LSB is set by instructions A70 through A79. The value to be loaded is contained in a translate table called ltbl and is obtained by the XLAT instruction.

To reset the DLAB bit and set up the data word for no parity, 8 bits and one stop bit, the value 3 is written to the Line Control register.

The value 3 is next written to the Modem Control register to turn on Data Terminal Ready (DTR) and Request to Send (RTS) pins 33 and 32 respectively on the 8250 chips (see FIG. 2D). DTR and RTS signal the device that the chip is ready to communicate. Finally, the value "1" is written to the interrupt register to enable the Read Data Interrupt Only.

To select test and demonstration operation, DIP switch 4 is used. Instructions A8B through A93 test to see if this switch is on and act accordingly. If the switch is on, instructions A96 through AAB are operative. If the switch is off, the program jumps to AAD, the 'ecr' location.

The first instruction of the test mode is at location A96 and calls the subroutine 'wep'. The 'wep' subroutine waits for an interrupt for either 8250 chip (see page 1-13 of the listing) and then turns on DTR and RTS to both ports telling the rest of the world that it is ready to receive data. Data is received on the RxD pin (10) on the 8250. When valid data is received, the 8250 issues an interrupt on pin 30. The program reads the interrupt port 50h and checks to see if either bit 1 or bit 2 is set. If neither bit is set, it loops infinitely until one of them does set. As soon as one of the bits sets, the program returns to the caller location. The next instruction in the test routine, location A99, tests to see which bit is set. If the interrupt was caused by port "B", bit 2 will be on and the jump to 'ptb' will be taken. If port "A" interrupted, the 'pta' path is taken.

The subroutines 'rdpta' and 'rdptb' are nearly identical. They are the read port "A" and read port "B" routines. The only difference between the two is which 8250 is being read. Referring to page 1-16 of the program listing, the 'rdpta' subroutine will be described by way of example.

The first operation in 'rdpta' is to write "0" to the Modem Control register. This shuts off DTR and RTS telling the outside world that the port is busy.

The next action is to read the Line Status register and test bit 1 to see if data is actually present. The last step is to read the character into the processor AL register and return to the caller.

The 'wrpta' and 'wrptb' subroutines have the same relationship ad 'rdpta' and 'rdptb', that is, they are the same except for which port is active. The 'wrpta' and 'wrptb' labels mean write port "A" and write port "B". Referrng to page 1-16 of the listing, 'wrpta' will be described here by way of example.

First, RTS and DTR are turned on in case they are not on already. Next the Line Status register is read to determine that the transmitter is indeed ready. Next the Modem Status register is read to determine that the receiver at the other end is ready. At this point a time-out loop is implemented so that the program will not hang here if there is no response from the other end. If the program times out, an 80h is returned in the AH register serving as an error indicator. If all goes well, the final operation is to transmit the character and return.

The test operation receives clear data from either port and passes it through undisturbed and may be summarized as follows:

1. The program waits at the 'wep' subroutine for an interrupt from either port "A" or port "B" of the 8250 chips.
2. The program then decides which port called it.
3. If port "A" called, the program calls the 'rdpta' subroutine to read the character, calls the 'wrptb' subroutine to send the character to port "B", and returns to the 'wep' subroutine for another character from either port.
4. If port "B" called, the program calls the 'rdptb' subroutine to read the character, calls the 'wrpta' subroutine to send the character to port "A", and returns to the 'wep' subroutine for another character.

If the test switch is not on, the program goes to the 'ecr' location (AAD). At this point, communication is NOT established between the two devices. Both are waiting for an input from the other. Both programs are sitting in the 'wep' subroutine loop at location AB3.

The calling sequence can be initiated from either end. For discussion purposes, one end will be called the "send" and the other end the "receive".

The send end must initiate the process by sending the word 'call' to the system. When the first character is sent, the receive end comes out of its 'wep' loop by servicing the interrupt from port "B". This interrupt is sensed at location AB6 and causes the program to proceed to the 'snd' routine. The 'call' message is compared to the word 'call' stored in the ROM data area by instructions ABD through ADC. If the four characters match, the program proceeds with 'snda' at location ADE. If any character is received that is out of order or incorrect, the program resets to the beginning and waits for the correct sequence. At this point, the program is "locked up" and the unit cannot be communicated with until the correct sequence is entered.

At the beginning of 'snda' the program does a little housekeeping and issues a carriage return to the caller. It then waits at location AC3 for a single character input from the caller. This character must be either 1 through 9 or A through F. This condition is tested by instructions AF8 through B09. Any character outside these limits will result in a jump to 'erla'. The net result of 'erla' is that a message which says "Invalid-Try again" is returned to the sender. The program then returns to 'strl' at location AEC and waits for a valid input. Once again, the program is locked in this condition until a valid character is entered.

Upon receipt of a valid character the program proceeds to 'tyl' location B0B. At this time the decision is made if the character is numeric or alpha. If the character is numeric, the program jumps directly to 'ty2'. If the character is alpha, 'asel' is run and then 'ty2'. The 'asel' sequence changes the ASCII character to a hex character in the range 0Ah to 0Fh. These represent the decimal numbers 10 through 15. What the foregoing accomplishes is to let the program known which of the 15 groups of four tables each the user wishes to operate in. The resultant value is stored in RAM by instruction B24.

Instruction B27 loads the address of the first csum number that was stored into the processor's SI register. B2D adds the offset contained in the AL register to the value already in the SI register resulting in the address for the desired table group to be located in the SI register. B2F loads the csum value into the AL register. The character is then sent to the other end by the 'wrpta' subroutine. Instructions B39 through B4F adjust the read and write base pointers in RAM to find the four "0" locations associated with the csum just sent.

Until this point, the receiving end device has been idling at its 'wep' subroutine location AB3. When the send end issues "wrpta", the receive end gets a port "A" interrupt. It then comes out of the 'wep' loop and jumps to its 'rcva' location. The send end is now idling at location B5D awaiting a response from the receive end. This idle state has a time-out condition which will invoke an error message if no response is forthcoming. This is the "No Communications" message.

Meanwhile, at the receiving end, the program has jumped to the 'rcva' subroutine location BDA (see page 1–7 of the listing). The program at this point insures that its pointers are all cleared and then reads the incoming character at instruction BE0. Instructions BE3 through BF8 compare the incoming csum number to the 15 numbers stored in its ROM data area. If a match is found, an offset number corresponding to the location of the matched number is stored in the tcsum area of the RAM. Up to five such numbers may be stored in this area which allows for the unlikely possibity of two csum numbers having the same value. If this situation occurs, there is still no problem since the "0" location numbers will not be the same. If no match is found, a "0" offset is assumed. This is not a problem because an error condition will occur later when further comparisons are made.

Having made its comparisons, the program now proceeds to adjust its table base pointers to correspond to the first offset value stored by the comparison in the tcsum location. This is accomplished by instructions BFA through C17. Instruction C19 now stores these new-found parameters for future use.

As previously described, sixty table sets containing sixty address locations of the number "0" were stored in ROM locations. The operations described in the previous paragraphs have adjusted the pointers to point to a group of four addresses within these sixty tables. Instructions C1C through C2A send these four characters sequentially back to the send end.

Since these characters were originally taken from the scrambled portion as opposed to the unscrambled portion of the tables, they appear to the send end as scrambled numbers. The receive end now goes into a wait condition at instruction C36.

It is now time for the send end to "wake-up". As previously mentioned, the send end is waiting for a response at location B5D. The response it is waiting for is a scrambled set of "0" locations corresponding to the table group it selected. Upon receipt of a character, the send device reads it, translates it to get the unscrambled value, and compares that unscrambled value to "0". Any value other than "0" is an error and a message is sent informing the user of the same.

If we are successful up to this point, the send end transmits the word "CALL" to the receive end in scrambled text. The receive end reads the word, unscrambles it, compares it for accuracy, and returns a message. Both ends now jump to 'scrm' and communication is established.

The code from C6E through CCB allows for up to five retries in the event of duplicaton of csum numbers. It discards the first try, retrieves the second offset, increments a counter to keep track of retries, and returns to 'tryl' to start again.

Upon arriving at 'scrm', both ports orient themselves and stop at 'wep' location CD7 to await the arrival of some activity from either end. When an interrupt arrives from either port the program once again determines which port and proceeds accordingly. If the interrupt is from port "B" the program jumps to 'scrb', otherwise it proceeds at location CDE.

The section of the program from CDE to D1C is essentially the same as that of the 'scrb' subroutine. The major difference is the direction of data flow. The heart of the table jumping scheme is the 'scrb' subroutine which is the program that receives clear data, scrambles it, and sends encrypted data to the other end.

When port "B" receives a character from the transmitting device, it jumps to location D1E. This instruction is a call to the 'rwb' subroutine. This routine reads the address for the base of the current table to be used in the scrambling operation and places it in the BX register of the processor. The reason for this is given in the explanation of the XLAT instruction from the 8088 microprocessor. Instruction D21 reads the character just received and instruction D24 performs a translation to identify a corresponding location in the scramble table as described on the XLAT instruction description. The new scrambled character is retrieved and is now located in the AL register of the processor. Instruction D27 sends the scrambled character to the remote device. The remote device now reverses the process by executing instructions CDE through CE7. The scrambled character is received and the instructions translate it to identify a corresponding address location in the receive table. The clear character is retrieved from that location and sent to the computer.

Instruction D2F is a call to the 'dpes' subroutine which looks for five consecutive "&"s followed by a carriage return. If it sees this sequence, it will disconnect communications and return to 'ecr', requiring the 'call' sequence to be executed once again. However, the data had been scrambled by the XLAT instruction at D24. For this reason, the base address in the BX register is changed by D2A to the read table base and the XLAT instruction at D2C restores the original data. This is done after the scrambled character is sent because this condition is sensed at both ends and both units are therefore simultaneously disconnected without locking either in an undetermined condition.

Following the 'dpes' instruction, the BH register is decremented to restore the BX register to the write base address. The ROM Data Segment is stored and the Data Segment is changed to the RAM area by the call to 'stds'.

When data is being transferred, the table set being used is changed with each character being sent or received. The first character uses the first table set. The base address is then changed to the second table set for use with the next character. When the 4th set is reached the count changes direction and the base addresses count down to the first table set and the direction is changed again. The 'btdir' location in RAM controls the direction of the count. Instruction D38 tests the condition of bit 2 in this pointer. If bit 2 is a "1", we are counting down. If bit 2 is "0", we are counting up. Bit 1 performs the same function for the read portion. (see instruction CF1) If the result of the test of instruction D38 reveals bit 2 to be a "0", instruction D3F is executed. Adding 2 to the BH register effectively changes the BL register address by 512 bytes, therefore setting the next table base. A comparison is made to 'wrtop' to see if the top of the four table set has been reached. This location was set to its proper value during the 'call' sequence at either B54 or C19 depending on the calling direction. If the top has been reached, D48 sets the direction bit in the 'btdir' pointer. The BX register is then lowered by two table sets. This is because 'wrtop' is intentionally set too high and is not intended to be used. If this was not done, the fourth table set would never be used. The program then jumps to D5E where the new value for the table base is stored. The ROM Data Segment is restored and the program waits for the next interrupt. If the result of the test at D38 reveals bit 2 to be a "1", the program jumps to D52 where BH is lowered by 1 table set. A comparison is made to the SI register which was permanently set to the bottom write address at CD1. (The DI register is used for read operation.) If the bottom has not been reached, the program goes to D5E where the new location is stored and the program returns to the 'wep' subroutine. If the bottom has been reached, D59 clears the direction bit in the 'btdir' pointer before storing the new value.

It is assumed that any write from either device port "A" has a corresponding read at the other end. Because the read at one end is dependent upon the write occurring at the other end, both table bases change at the same time, but the read and write baess at the same end do not necessarily stay with each other.

From the foregoing description, it will be apparent that modifications can be made to the apparatus and method for using same without departing from the teaching of the present invention. Accordingly the scope of the invention is only to be limited as necessitated by the accompanying claims.

We claim:

1. A method of encrypted communication of a digital signal character between a first computer and a second computer comprising the steps of:
    a. storing an array of digital signal characters at memory address locations within a first computer memory and storing an array of digital signal characters at memory address locations within a second computer memory wherein each array in said first computer memory has associated a complementary memory array in said second computer memory in that the character stored within a first address of memory in the first computer memory is the address of the location in the memory of the second computer memory containing the first address;
    b. identifying an index corresponding to a range of memory address locations of said array of digital signal characters in said first computer memory;
    c. transmitting said index to said second computer;
    d. identifying a range of computer memory address locations in said second computer memory corresponding to said index;
    e. identifying a memory address location of a predetermined digital signal character in said second computer memory;
    f. transmitting said address identified in step e to said first computer;
    g. receiving said transmitted address;
    h. verifying the validity of said transmitted address and allowing further communication only if said address is valid;
    i. identifying a computer memory address location in said first computer memory corresponding to a digital signal character for which encryption in sought;
    j. retrieving a digital signal character stored within said address in said first computer memory as the encrypted representation of said digital signal character;
    k. transmitting said encrypted representation to said second computer;
    l. receiving said transmitting encrypted representation of the digital signal character;
    m. identifying a computer memory address location in said second computer memory corresponding to said received encrypted representation of the digital signal character; and
    n. retrieving the decrypted digital signal character from the computer memory address location within said second computer.

2. The method of claim 1 wherein Step a. further comprises storing distinct arrays of characters at memory address locations within a plurality of first computers whereby said memory of said second computer maintains a complementary array for each array in each first computer.

3. A method of encrypted communication of a series of digital signals comprising the steps of:
    a. storing a plurality of arrays of digital signal characters at memory address locations within a first computer memory and storing a plurality of arrays of digital signal characters at memory address locations within a second computer memory, wherein each array in said first computer memory has associated a complementary array in said second computer memory in that the character stored within a first address of memory in the first computer memory is the address of the location in the memory of the second computer memory containing the first address;

b. identifying an index corresponding to a range of memory address locations of an array of digital signal characters in said first computer memory;

c. transmitting said index to said second computer;

d. identifying a range of computer memory address locations in said second computer memory;

e. identifying a memory address location of a predetermined digital signal character in said second computer memory corresponding to said index;

f. transmitting said address identified in step e to said first computer;

g. receiving said transmitted address;

h. verifying the validity of said transmitted address and allowing further communication only if said address is valid;

i. selecting an array within said memory of said first computer memory and selecting an array within said memory of said second computer complementary to said array within said first computer memory;

j. identifying a computer memory address location within said array in said first computer memory corresponding to a digital signal character for which encryption is sought;

k. retrieving a digital signal character stored within said address as the encrypted representation of said digital signal character;

l. transmitting the encrypted representation of said digital signal character to said second computer;

m. receiving said transmitted encrypted representation of said digital signal character;

n. identifying a computer memory address location in said second computer memory corresponding to the received digital signal;

o. retrieving a digital signal character stored within said address as the decrypted representation of said digital signal character; and p. repeating steps i throught o until all signals within said series have been encrypted, transmitted and decrypted.

4. The method of claim 3 wherein Step a. further comprises storing distinct arrays of characters at memory address locations within a plurality of first computers whereby said memory of said second computer maintains a complementary array for each array in each first computer.

5. A method of encrypted communication of a digital signal character between a remote computer terminal and an accessible computer comprising the steps of:

a. coupling a first security device having a first computer therein to the communication port of the remote computer terminal for receiving the digital signal therefrom, wherein said first computer has stored within its memory address locations an array of characters;

b. coupling a second security device having a second computer therein to the communication port of the accessible computer, wherein said second computer has stored within its memory address locations an array of characters wherein said array in the second computer is complementary of the array in the first computer in that the character stored within a first address of memory in the first computer is the address of the location in the memory of the second computer containing the first address;

c. identifying an index corresponding to a range of memory address locations of an array of digital signal characters in said first computer memory;

d. transmitting said index to said second computer;

e. identifying a range of computer memory address locations in said second computer memory corresponding to said index;

f. identifying a memory address location of a predetermined digital signal character in said second computer memory;

g. transmitting said address identified in step f to said first computer;

h. receiving said transmitted address;

i. verifying the validity of said transmitted address and allowing further communication only if said address is valid;

j. identifying a computer memory address location in said first computer memory corresponding to a digital signal character for which encryption is sought;

k. retrieving a digital signal character stored within said address as the encrypted representation of said digital signal character;

l. transmitting said encrypted representation to said second computer of said second security device;

m. receiving the transmitted encrypted representation of the digital signal character by the second security device;

n. identifying a computer memory address location in said second computer memory corresponding to said received encrypted representation of the digital signal characters;

o. retrieving the decrypted digital signal character from the computer memory address location within said second computer; and p. transmitting the digital signal from the second computer of the second security device to the accessible computer.

6. A security system for controlling access to an accessible computer by a remote terminal digital signal character transmission comprising:

a. a first security device electrically coupled to said remote terminal and containing a computer memory having stored therein an array of characters wherein the memory address of each array character corresponds to characters transmited by the remote terminal;

b. means for receiving digital signal character transmissions from the said remote terminal, identifying a memory address corresponding thereto, and selecting a character from the security device computer memory as the encoded representation of the character;

c. means for transmitting said encoded representation of the character;

d. a second security device electrically coupled to the accessible computer and having means for receiving said encoded character;

e. a computer memory in said second security device having stored at address locations therein an array of characters wherein the address of each character corresponds to the encoded representation of a particular character located within said address;

f. means for selecting a character from the second security device computer memory by identifying a memory address corresponding to the encoded signal and retrieving the character at the said address; and g. means for communicating said retrieved character to the accessible computer;
h. means for identifying an index corresponding to a range of memory address locations in said computer memory of said first security device;
i. means for transmitting said index to said second security device;
j. means for identifying a range of computer memory address locations in said computer memory of said second security device corresponding to said index;
k. means for identifying a memory address location of a predetermined digital signal character in said computer memory of said second security device;
l. means for transmitting said address of said predetermined character to said first security device.
m. means within said first security device for receiving said address of said predetermined character;
n. means within said first security device for verifying the validity of said address of said predetermined characters and preventing access unless said address is valid.

7. In a key access system for controlling access to an accessible computer by a remote terminal transmitting encoded digital signal characters and transmitting an index corresponding to a computer memory address, a decoding security device electrically interconnected between the transmission medium and the transmission port of the accessible computer comprising:
 a. a computer memory having an array of characters at address locations therein wherein the address of each character corresponds to the encoded signal of a particular character;
 b. means for selecting a character from the decoding security device computer memory by identifying a memory address corresponding to the encoded signal and retrieving the character at the said address as the decoded character;
 h. means for identifying a range of computer memory address locations in said computer memory of said security device corresponding to said index;
 k. means for identifying a memory address location of a predetermined digital signal character in said computer memory of said second security device;
 l. means for transmitting said address of said predetermined character to said remote terminal for verification, whereby further communication is prevented unless a predetermined response is obtained.
 m. means for checking certain decoded characters against predetermined characters; and
 n. means for communicating said retrieved character and subsequent retrieved characters to said accessible computer only if the certain decoded characters match the predetermined characters.

8. A key access system for controlling access to an accessible computer by a remote terminal comprising:
 a. a decoding security device electrically interconnected between the transmission medium and the transmission port of the accessible computer comprising:
  i. a computer memory having an array of characters at address locations therein wherein the address of each character corresponds to the encoded signal of a particular character;
  ii. means for selecting a character from the decoding device computer memory by identifying a memory address corresponding to the encoded signal and retrieving the character at the said address as the decoded character;
  iii. means for checking certain decoded characters against predetermined characters; and
  iv. means for communicating said retrieved character and subsequent retrieved characters to said accessible computer only if the certain decoded characters match the predetermined characters; and
 b. a key access device electrically interconnected between the transmission port of a digital signal transmitting remote computer terminal and the transmission medium wherein said key access device comprises:
  i. a computer memory having an array of characters at address locations therein;
  ii. means for identifying a memory addresses location corresponding to the digital signal and selecting from the array a character stored within said address as the encoded representation of the digital signal; and
  iii. means for transmitting the said selected character as the encoded representation of the digital signal.

* * * * *